(12) United States Patent
Lambert

(10) Patent No.: US 8,444,931 B2
(45) Date of Patent: May 21, 2013

(54) RETORTING APPARATUS AND METHOD

(75) Inventor: David Lambert, Swansea (GB)

(73) Assignee: Research and Development Systems Limited, Langland, Swansea (GB)

( * ) Notice: Subject to any disclaimer, the term of this patent is extended or adjusted under 35 U.S.C. 154(b) by 660 days.

(21) Appl. No.: 12/593,642

(22) PCT Filed: Mar. 31, 2008

(86) PCT No.: PCT/GB2008/001146
§ 371 (c)(1),
(2), (4) Date: Sep. 29, 2009

(87) PCT Pub. No.: WO2008/119991
PCT Pub. Date: Oct. 9, 2008

(65) Prior Publication Data
US 2010/0129511 A1    May 27, 2010

(30) Foreign Application Priority Data

Mar. 31, 2007  (GB) .................................. 0706334.0

(51) Int. Cl.
*A61L 2/04* (2006.01)
*A61L 2/00* (2006.01)
*A23L 3/18* (2006.01)

(52) U.S. Cl.
USPC .............................. 422/307; 422/304; 99/470

(58) Field of Classification Search
USPC ....................... 422/304; 99/470; 426/407, 412
See application file for complete search history.

(56) References Cited

U.S. PATENT DOCUMENTS

| | | | | |
|---|---|---|---|---|
| 2,362,733 | A * | 11/1944 | Thompson et al. | 99/361 |
| 3,511,168 | A * | 5/1970 | Pech | 99/360 |
| 3,927,976 | A * | 12/1975 | Reimers et al. | 422/296 |
| 5,476,635 | A * | 12/1995 | Stoker | 422/26 |

* cited by examiner

*Primary Examiner* — Kevin Joyner
(74) *Attorney, Agent, or Firm* — Galgano & Associates, PLLC; Thomas M. Galgano; Jessica G. Bower

(57) ABSTRACT

An apparatus for the heat treatment of a product, especially a food product such as a food product contained within a hermetically sealed container or pouch of plastics or like material, for example for sterilization, pasteurization or cooking, having a heating unit to bring product from ambient towards a heat treatment temperature and pressure; a retort unit to apply a heat treatment to a product; and a cooling unit to allow product to be brought down from heat treatment temperature and pressure towards ambient; wherein each unit and retort is selectably sealable from the others and from ambient conditions.

24 Claims, 6 Drawing Sheets

RETORTING APPARATUS AND METHOD

This invention concerns an apparatus and method for the heat treatment for example for sterilisation/pasteurisation/cooking of food products, especially those contained within hermetically sealed plastic containers or pouches to preserve them.

Cooking food at high temperatures in a sealed environment extends its shelf life, or preserves the food. At temperatures between 60 C to 110 C the preservation method is known as Pasteurisation and from 110 C to 135 C it is known as Sterilisation.

The most common machine to sterilise food is known as a Retort. This is essentially a large cooking oven heated by steam or water or a combination of both capable of operating at temperatures up to 135 C and applying, in certain applications, an 'overpressure' to aid the cooking process Sterilising food in sealed metal containers is known as canning and this has been one of the principal methods of preserving food at ambient temperatures (10 C to 40 C) from the early 1800s. Retorting of canned goods can be achieved by individual batch processing or by continuous retorting. Clearly, over 200 years the technology to preserve foodstuffs by canning has reached a high degree of optimisation, both in the production and filling of the can, as well as the sterilisation within the retort. The most efficient way of sterilising cans for high volumes at lowest cost is by continuous retorting. The continuous retorting of metal cans is facilitated by the metal cans' inherent strength, even at sterilisation temperatures. Because of this strength a can is able easily to accommodate the steam pressure generated by the product as it is cooked/pasteurised/sterilised. In this way the continuous metal canning retort designer only has to worry about the heating and cooling of the product as no pressurisation of the continuous retort, which is necessary for plastic packaging, is necessary.

The advent and increasing popularity of microwave ovens in the last 20 years to heat up preserved foods has caused problems for the canning industry as the metal containers cannot be satisfactorily heated in microwave ovens.

Improving technology in the laminated plastics industries has permitted effective barrier properties to be combined with physical strength and ambient temperature (<40 C) rigidity to effectively replace the 'metal can' with the 'plastic can' pouch or tray which can be pasteurised sterilised and also microwaved.

This new technology is rapidly replacing canning as the number one heat preservation method for foodstuffs intended to be stored for prolonged periods at ambient temperature and current volumes world wide of the most popular plastic container, the retortable 'stand-up' pouch now exceeds 15 billion ($15 \times 10^9$) units per annum. This total is expected to double over the next 4 years as growing concerns over the physical volume taken up by rigid plastic containers in landfill continues to drive the market.

Eventually, plastics are projected to largely replace metal in the construction of sealed food containers used to pack sterilised and pasteurised foodstuffs.

The technology surrounding the microwavable plastic containers is still at a relatively early stage and it is set against this background that the current invention has been developed. Present systems rely on batch retorting of these products because the plastic containers have little or no resistance to the internally generated steam/gas pressure caused by the heating process at the elevated temperatures needed to preserve the food. Indeed they have so little strength at temperatures above 100 C that they also need some physical support such as a cradle in order to avoid permanent deformation or even failure. This is of even greater significance where the product has to be rotated during processing to aid the cooking process for example to mix ingredients to produce the required organoleptic properties or to improve the rate of heat exchange to minimise nutritional or other organoleptic degradation caused by excessive heat processing. Because of these constraints the retort has to closely match the internal pressure of the plastic container throughout the heating and subsequent cooling of the food by the application of an equal 'overpressure' created by the application of additional steam and or compressed air to the inside of the retort during processing.

It is an object of the present invention to mitigate some or all of the above disadvantages.

It is a particular object of the invention to provide a system and method for the heat treatment of food products, for example for sterilisation/pasteurisation/cooking, which lends itself especially well to products contained within hermetically sealed plastic containers or pouches or like plastic/composite packaging suitable for subsequent microwave heating.

It is a particular object of the invention to provide a system and method that lends itself to a more continuous processing protocol with precise control of rotational movement than has been possible with some prior art systems.

Thus, in accordance with the invention in a first aspect there is provided an apparatus for the heat treatment of a product, especially a food product such as a food product contained within a hermetically sealed container or pouch of plastics or like material, for example for sterilisation, pasteurisation or cooking, which apparatus comprises:

a plurality of support means within which to support product to be processed is held to retain the shape and separation each from one another;

a heating unit to bring product held within the aforesaid support means from ambient towards a heat treatment temperature and pressure; a retort unit to apply a precise heat treatment to a product; and a cooling unit to allow product to be brought down from heat treatment temperature and pressure towards ambient; wherein each unit and retort is selectably sealable from the others and from ambient conditions; and wherein the retort comprises a retort chamber enclosing a volume incorporating a plurality of mounting means orbitally mounted about a longitudinal axis of the chamber so that each mounting means is movable at least between a first position whereat it is aligned with an outlet of the heating unit whereby product can be loaded onto the mounting means, and a second position whereat it is aligned with an inlet to the cooling unit whereby product can be unloaded from the mounting means.

The key to the invention is thus the provision of at least three enclosed volumes through which a product to be treated is passed serially in use, each enclosed volume being separately sealable from the other volumes and from the outside. In use, product to be heat treated is fed into a heating unit, and for example into a volume defined by a heating unit vessel. This may be via a suitable inlet. A suitable outlet is similarly provided capable of communicating with the retort chamber. Each of the inlet and the outlet is provided with a closure to close the same and, with both closures in a closed position, to complete enclosure of the volume, and preferably to hermetically seal the same. Where four or more enclosed volumes are used, the fourth and subsequent enclosed volumes can be used as pre-heating volumes or cooling volumes. It will be recognised that the more enclosed volumes are included, the closer the apparatus approaches being an apparatus that provides for continuous processing of product. Moreover, where four or more enclosed volumes are employed the first or the final volume may not require such a closure where the inlet or the outlet connects with the atmosphere. Thus, where pressurising or high temperatures are not required, valves can be shut more quickly and a pre-heating or a pre-cooling step can take place more rapidly. In addition, as the valve does not have to withstand such rigorous conditions, the valve can be more cheaply made.

The initial stage of processing is thus essentially a batch process. Objects to be heat treated are fed into the heating unit, it is closed, and the heating unit is brought up from ambient temperature and pressure towards a temperature and pressure which corresponds to the desired heat treatment temperature and pressure which is maintained within the retort.

At this point, an outlet from the heating unit, aligned with an inlet in the retort, is opened and product passed into the retort. The retort is resealed. The product is then heat treated within the retort at the desired temperature and pressure.

A plurality of mounting means is provided laterally spaced from and capable of orbital motion around a longitudinal axis within the primary vessel. As the mounting means are moved about this axis during use, each mounting means is thus successively presented at an outlet of the heating unit to be sequentially loaded with product. Rotation of the mounting means assembly about this axis successively presents mounting means to receive product, and correspondingly presents mounting means for unloading.

This is achieved in that a cooling unit is so positioned as to provide an inlet able to align successively with an outlet of each of the mounting means in use, to receive heat treated product. The cooling unit is then sealed and temperature and pressure brought down towards ambient in a controlled manner before the product is unloaded via an outlet of the cooling unit. Thus, the heating and cooling units essentially operate as a batch process, but the retort can effectively operate a continuous process and in particular can be maintained throughout at or about optimum heat treatment temperature and pressure. At least some of the inefficiencies inherent in batch processing can be mitigated or eliminated.

Each of the heating unit, the cooling unit and the retort unit comprises at least one pressure vessel with suitable closures capable of enclosing a volume to contain product to be treated, and in particular to effect a hermetic seal of the same. Each volume has an inlet and an outlet provided with a closure to effect a selectively sealable communication in the serial manner above described. A single opening or set of openings may serve as both inlet and outlet to a volume or sub-volume to be selectively sealable as described without departing from this principle. A common closure between a communicating outlet of one volume and inlet of another volume may serve as both inlet and outlet closure without departing from this principle.

The retort unit further comprises a plurality of elongate-mounting means such as a spigot, which conveniently lie generally parallel to each other, and parallel to a longitudinal axis of the pressure vessel. Each mounting means is journalled for orbital motion about this axis in use. The mounting means are conveniently operatively associated together so as to rotate together about this longitudinal axis in an orbital motion during use. For example the mounting means are disposed on a common structural frame. The mounting means are conveniently at a generally even lateral spacing from a common axis, and further conveniently at a generally even angular spacing from each other. For example four, five or six mounting means are provided evenly distanced from a central axis, and for example a central axial mounting, and respectively at 90°, 72°, 60° to each other. The same principles will apply to other arrangements numbers of mounting means In order to provide efficient heat transfer, the retort of the apparatus can be provided with circulation means such as a fan to ensure that the flow of air and steam in the retort passes over the surfaces of the product to be sterilised. In addition, to guide the flow, baffles can be provided which direct flow where required. A baffle can conveniently be in the form of a concentric tube surrounding a cassette or series of cassettes.

For example where one or more cassettes holding product is mounted on a spigot, the tube surrounds each of the cassettes mounted to a particular spigot. In this case, the tube is mounted for synchronised orbital rotation with the spigot.

Each of the heating and cooling units may comprise a single pressure vessel, or may comprise a series of such vessels or chambers each successively communicating with the other and each defining a separately isolatable volume. In one embodiment each of the heating and cooling units comprises a pair in series of such vessels or chambers.

The volume defined by each pressure vessel comprising the heating unit, retort and cooling unit, and where applicable, is preferably provided with at least one inlet and at least one outlet. For example, each such vessel volume and/or chamber is generally elongate, and has an inlet at a first end and an outlet at a second end, an inlet an outlet at the same end laterally spaced, or a common inlet/outlet. Openable closures are provided to effect selective closure of each inlet and outlet so that each volume and/or chamber can be sealingly closed and isolated to define a separate pressure vessel. An adjacent communicating inlet/outlet pair may be provided with a single openable closure, for example a common gate valve. By successive opening and closing of the appropriate closures at the appropriate inlets and outlets the progress of an object to be heat treated through the serial array of volumes, and for example the serial array of chambers, defining the apparatus of the invention to effect its controlled heating and pressurising, heat treatment, and cooling and depressurising is readily achieved.

It is necessary to provide a conveyor or series of conveyors to pass product through the various volumes or chambers during use. For example a belt or chain conveyor or a piston operated by compressed air or hydraulics, or any other is provided on which product can be loaded.

In a preferred embodiment a product agitator and/or a product rotator is also provided for association with the product in at least one and preferably all of the various volumes or chambers, for example in association with or forming part of the conveyor. The product agitator and/or product rotator can agitate and/or rotate (preferably in either sense) a product within the volume or chamber. This might serve two purposes. First, it might serve to agitate and/or rotate product where mixing of contents improved heat transfer and/or elimination of air pockets is desirable. Second, a rotator of a mounting means within the retort could be operated in a contrary sense to the orbital movement of the mounting means to keep product therein level where level processing was desirable. Thus in a preferred embodiment at least each mounting means in the retort, and preferably also each volume or chamber in the heating and cooling units, is provided with a product rotator to rotate (preferably in either sense) a product therewithin. And in a preferred embodiment carriage means are provided. Said rotation is particularly advantageous where plastic packaging is used. Firstly, heat transfer within the product is enhanced. Secondly, plastic materials can be transparent to visible light and therefore it is important that even coating take place of any material within the packaging. This is especially the case where packaging drier foodstuffs which have in recent years become more prominent due to the changing pattern of food consumption.

In order to control the product quality and consistency, the rate of rotation is enabled to be variable by the user, either manually or by means of a pre-set programme. When so desired, the rotation rate can be set to zero.

In a preferred embodiment carriage means are provided to transport product through the system. For example, the carriage means comprise means to retain packages of packaged product such as food product. Conveniently, such packaging comprises plastics, containers, pouches or the like, preferably hermetically sealed. In particular, each carriage means comprises a transport cradle with a capacity to receive a plurality of such package products for processing. A carriage may for example be adapted to receive a plurality of package products in a lateral array or a radial array. The former arrangement may be useful if it is desired to keep product flat during processing. The latter arrangement may be useful if it is desired to rotate product during processing.

Where a transport carriage is provided, the conveyor or series of conveyors or piston and product agitator and/or product rotator are convenient arranged to act thereon. For example a transport carriage is selectively connectible to a conveyor such as a conveyor chain so as to be transportable when so connected through the various volumes, chambers or sub-chambers during use. For example a transport carriage within a volume or chamber is mechanically associated with a product rotator so as to allow it to be rotated. A product rotator in one embodiment comprises at least a pair of elongate cylindrical support shafts on which the carriage sits within a volume or chamber, at least one of which is capable of driven rotation to impart a rotational motion to the carriage.

The invention in a preferred embodiment is thus a system of interconnecting but isolatable chambers through which pass products, for example in suitable transporting cradles or cassettes within which plastic product containers are retained. These chambers act as 'airlocks' or 'lock gates' to allow the products and for example plastic containers to be heated up to the treatment temperature with the corresponding overpressure in the heating unit prior to passing into a modified batch retort for sterilisation before being returned into another set of chambers which allow the controlled reduction of temperature and pressure to ambient levels for final packing and distribution.

The invention is an improved method of retorting plastic trays, bottles, 'stand-up' pouches, bags and any other semi rigid or flexible container which requires over-pressure during processing. Prior art continuous retorts do not allow accurate and rapidly variable over-pressure during the heat processing and subsequent cooling. Similarly, multi-stage and variable rotation of the containers can be needed, depending on product type, to facilitate mixing of ingredients and improvements in heat transfer.

Prior art continuous retorts do not allow such rotation. Prior art batch retorts designed for flexible plastic containers are expensive to purchase compared to their throughput and are not as energy efficient as continuous retorts. The difference in energy consumption is significant: A typical steam/air rotational retort with a capacity of 2,000 pouches can weigh up to 10 tonnes (excluding product and product trays). The energy required to heat this mass of stainless steel from 10 C to 125 C and then cool it down to 10 C is significant. This energy is not used to sterilise the food, it is all wasted—worse still, the continual heating and cooling with similar cycling of over pressure causes metal fatigue in the pressure vessel, limiting its life to between 10 and 15 years. At a cost of £200k per retort this is an additional cost caused by the batch operation.

In accordance with a further aspect of the invention there is provided a method of heat treatment of a product, especially a food product such as a food product contained within hermetically sealed containers or pouches of plastics or like material, comprising the use of an apparatus in accordance with the first aspect.

In accordance with a further aspect of the invention there is provided a method of heat treatment of a product, especially a food product such as a food product contained within hermetically sealed containers or pouches of plastics or like material, comprising the steps of:

passing product into one or more serially connected first volume defined by a heating unit;

heating the or each first volume towards a desired heat treatment temperature and pressure, each subsequent first volume being closer to the desired temperature and/or pressure than the previous first volume;

passing product into a second volume defined by a retort unit maintained at a desired heat treatment temperature and pressure;

retaining product therein to effect heat treatment thereof;

passing product into one or more serially connected third volumes defined by a cooling unit;

cooling the or each third volume towards ambient temperature and pressure, each subsequent third volume being closer to ambient temperature and/or pressure than the previous third volume;

retrieving the heat treated product;

the method being characterised in that:

the retort comprises a retort chamber enclosing a volume incorporating a plurality of elongate mounting means orbitally mounted about a longitudinal axis of the chamber so that each mounting means is moveable at least from a first position whereat it is aligned with an outlet of the heating unit whereby product can be loaded onto the mounting means, and a second position whereat it is aligned with an inlet to the cooling unit whereby product can be unloaded from the mounting means; and in that during the course of heat treatment a mounting means is caused to move from the said first position to receive product from the heating unit to the said second position to unload product to the cooling unit.

Each of the first, second and third volumes is selectively isolatable from each other volume and from ambient conditions so as to be able to serve as a separate and isolatable pressure vessel in use. For example, suitable closure means to selectively sealingly close inlets and outlets of such volumes and in particular to effect a hermetic seal thereof are provided as above described.

In accordance with a refinement of the method, each of the first volume, the second volume and the third volume is provided with an inlet and an outlet. A volume may have separate or common inlet and outlet. For example each volume is an elongate volume and has an inlet at a first end and an outlet at a second end, an inlet and an outlet at the same end laterally spaced apart, or a common inlet/outlet. The method then comprises the steps of:

opening an inlet to the first volume and passing product into the first volume; closing the inlet to close the first volume and heating as above described; opening an outlet of the first volume and an inlet of the second volume aligned with an inlet to a sub-chamber thereof to pass product into the second volume; closing the inlet of the second volume and effecting the heat treatment process above described;

opening an outlet of the second volume and an inlet of the third volume aligned with an outlet of the sub-chamber and passing product into the third volume;

closing the inlet to the third volume to close the same and cooling as above described;

opening an outlet of the third volume to retrieve treated product.

A step of opening/closing an adjacent outlet/inlet pair to effect communication between the associated volume may comprise the step of opening/closing a common closure between them such as a common gate valve.

In accordance with a possible embodiment of the invention, the heating unit and/or the cooling unit may comprise a plural series of chambers rather than a single volume, allowing temperature and pressure to be raised or lowered in step wise mariner. Again, each such chamber is provided with at least one inlet and outlet selectively sealable to facilitate the successive processing of a product in each chamber by analogy to the manner above described. Where two or more first chambers or two or more third chambers the first or the final volume may not require such a closure where the inlet or the outlet connects with the atmosphere. Thus, where pressurising or high temperatures are not required, valves can be shut more quickly and a pre-heating or a pre-cooling step can take place more rapidly. In addition, as the valve does not have to withstand such rigorous conditions, the valve can be more cheaply made.

Thus, the processing of objects in the heating unit volume (or in the successive chambers thereof) and in the cooling unit volume (or in the successive chambers thereof) is in effect a batch process, but the primary heat treatment phase in the retort has many of the characteristics of a continuous process, in particular in that the controlled and progressive raising of temperature and pressure in the heating unit and lowering of temperature in the cooling unit allows the retort itself to be maintained or at around the intended heat treatment temperature and pressure throughout processing, which could be for extended periods of up to 6 days or longer.

The rotational geometry of the mounting means within the retort also facilitates effective continuous processing. At its most basic, the retort chamber volume incorporates a plurality of elongate mounting means orbitally mounted about a longitudinal axis of the chamber so that each chamber is moveable from a position where it is aligned with an outlet of the heating unit to receive product to a position where it is aligned with an outlet of the cooling unit to pass product on. In practice, a plurality of mounting means are mounted for example in a circular array, and in accordance with the method of operation during a heat treatment phase each mounting means occupies a number of intermediate positions during the heat treatment phase.

In accordance with the preferred method of operation, N mounting means are provided in orbital array. In accordance with the method, as the array is rotated, a given mounting means occupies first a first position whereat it is aligned to receive product from a heating unit, subsequently N-2 intermediate positions in succession where it is aligned with neither the heating unit nor the cooling unit, and finally an Nth position whereat it is aligned with the cooling unit to pass product on. Thus, at any given time in the operating cycle a mounting means in the retort is being charged with product for heat treatment, another mounting means in the retort, for example being the one immediately preceding in a rotational sense the mounting means being charged, is positioned for discharge, and N-2 intermediate chambers are being heat-treated in the steam volume, with all N positions being at the required heat treatment temperature and pressure.

The number of mounting means which might be provided, and the frequency with which the arrangement might be rotated through each position, will be determined by desired process times, rotations, temperatures and pressures.

In a preferred embodiment of the method, product may be rotated during processing within at least one and preferably all of the various volumes or chambers, and preferably at least within the retort. This might serve to agitate and mix product where mixing of contents and/or elimination of air pockets is desirable, or to minimise processing time by improved heat transfer within product.

In an alternative embodiment a product may be kept level as it advances through the various volumes or chambers. In a refinement of this principle, product is kept level within the retort by rotating product therein in a contrary sense to, and to an extent exactly matching, the orbital movement of the mounting means.

Conveniently, a plurality of product carriages are provided each comprising a transport cradle with a capacity to receive a plurality of package products for processing and the method comprises the successive loading, processing of such carriages in the manner above described, and unloading of such carriages. It is normally envisaged that a load for a volume or chamber will comprise a plurality of carriages, and that these will be processed together, with successive loads processed sequentially through the system in accordance with the foregoing method.

A carriage may be loaded with a plurality of package products in a lateral array or a radial array. The former arrangement may be useful if it is desired to keep product flat during processing. The latter arrangement may be useful if it is desired to rotate product during processing.

Conveniently, the method is a method of heat treating packaged food product, for example in a package comprising plastics container, pouch or the like, preferably hermetically sealed. In an embodiment of the method, carriage means are provided to transport product through the system, for example comprising means to retain packages of packaged food products such as above described, and the method involves the initial step of filling such carriage means prior to passing the carriage means into the heating unit, and the final step of unloading such carriage means after discharge from the cooling unit.

Preferably, the heat treatment is at a temperature and/or pressure to effect one or more sterilisation, pasteurisation or cooking of the product.

Other preferred features of the method will be understood by analogy to the description of the apparatus and its modes of operation.

The invention will now be described by way of example only with reference to FIGS. 1 to 6 of the accompanying drawings in which:

FIGS. 1*a*-1*c* illustrates a magazine suitable for use with the current invention;

Figure 1A:
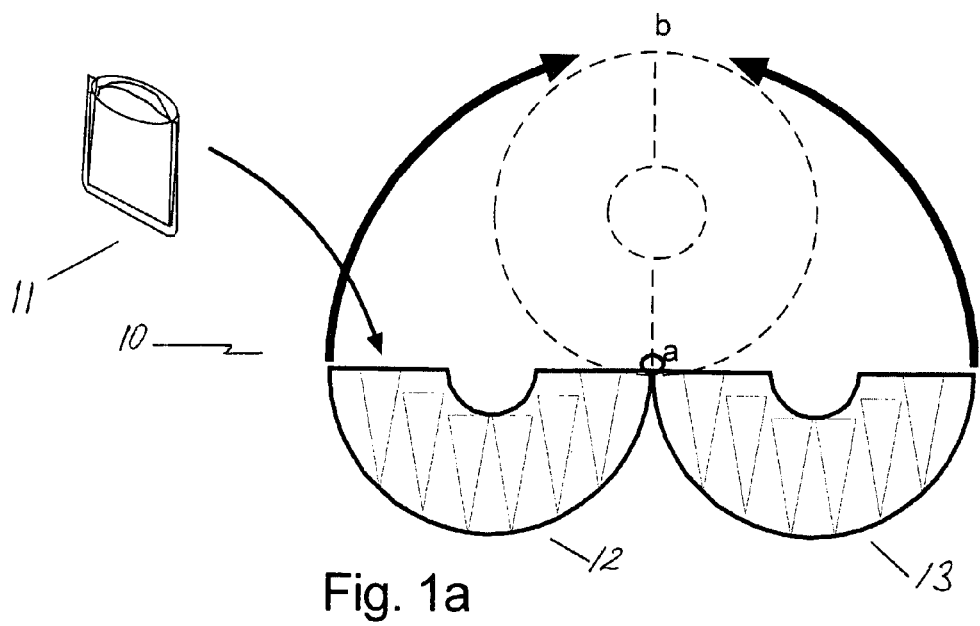
Figure 1B:
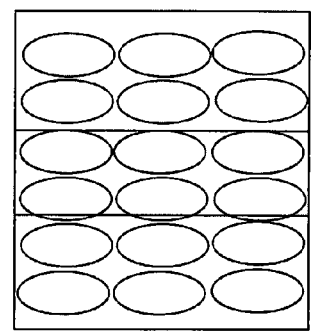
Figure 1C:
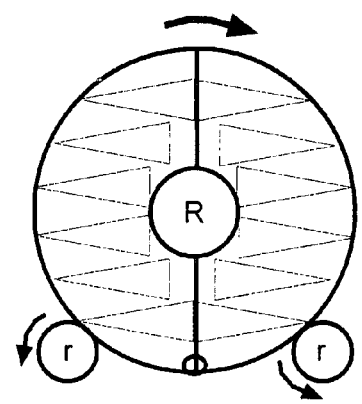

FIG. 1 illustrates a magazine, generally referenced 10, which is suitable for use in transporting pouches 11—formed of plastics material—through a retorting apparatus. The magazine 10 comprises two portions 12, 13 hingeably mounted to each other at point (a). The magazine 10 includes a number of supports which are matched to the shape of a pouch 11 and act to assist the pouch 11 in maintaining its correct shape when subjected to temperature or pressure variations.

Once the magazine 10 is fully loaded, the two portions, 12, 13 are brought together as indicated by Arrows in FIG. 1a and locked in position by a clasp b. The pouches are therefore also prevented from dropping out of the magazine 10 by means of the support framework of the assembled magazine 10. Said support framework is so configured as to enable fluid in the rotating apparatus to freely circulate about each pouch 11 and to minimise the area in contact with said framework. As the embodiment shows, the magazine 10 is designed to hold 36 pouches, 18 in each portion 12, 13.

The shape of the magazine 10 enables rotation of the pouches 11 housed therein during passage through the retorting apparatus. Said rotation can be achieved for example by the use of a central spigot R (see FIG. 1c) or a roller or rollers r.

The use of such a magazine also enables product control to be carried out. When dealing with products in plastic packaging, there is an increased risk, when compared with products held in tins, of the packaging being punctured. Moreover, in the processing steps, if one pack in a particular set is punctured then similar packs from other sets located in the same position will also be punctured. The use of the magazine to hold the pouches allows the weighing of same before and after passage through the retorting apparatus. If there is a significant change in the weights then this will be evidence that puncturing had taken place. For example, the magazine and pouches will be significantly heavier if one of the pouches has taken on water, or be lighter if it has lost part or all of its contents.

The preferred form of the invention comprises five chambers. This is illustrated by reference to FIG. 2, which shows the chambers in an open view, and schematically in a parallel block diagram. This number of chambers could be reduced to three or increased without limit. Product is carried through these chambers during processing.

Figure 3:
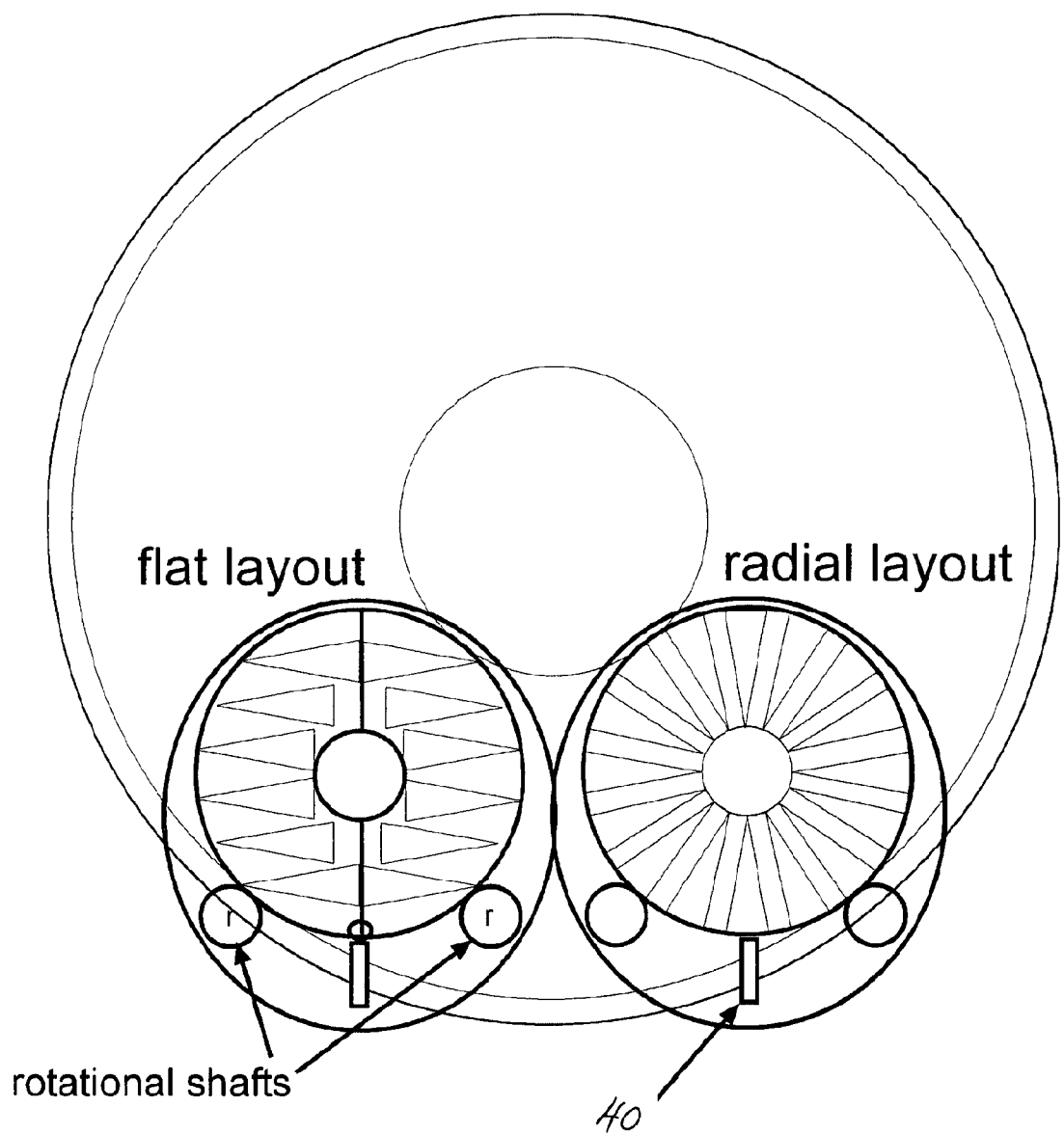
FIG. 3 illustrates two mounting means in the retort of FIG. 1 loaded respectively in a flat and a radial layout.

In general the magazines are fabricated from stainless steel sheet or injection moulded from plastic. The magazines comprise a number of pockets which are the same shape and size as the plastic container and which serve three purposes: to support the plastic container during processing and minimise deformation during the high temperature phase; to protect the container from damage during the movement of the containers through the retort and during any rotation phases; finally to guarantee sufficient gaps between the containers to allow efficient fluids flow and heat transfer. The magazines can be designed such that the product is arranged radially or horizontally (the two alternatives being illustrated in FIG. 3)

Figure 2:
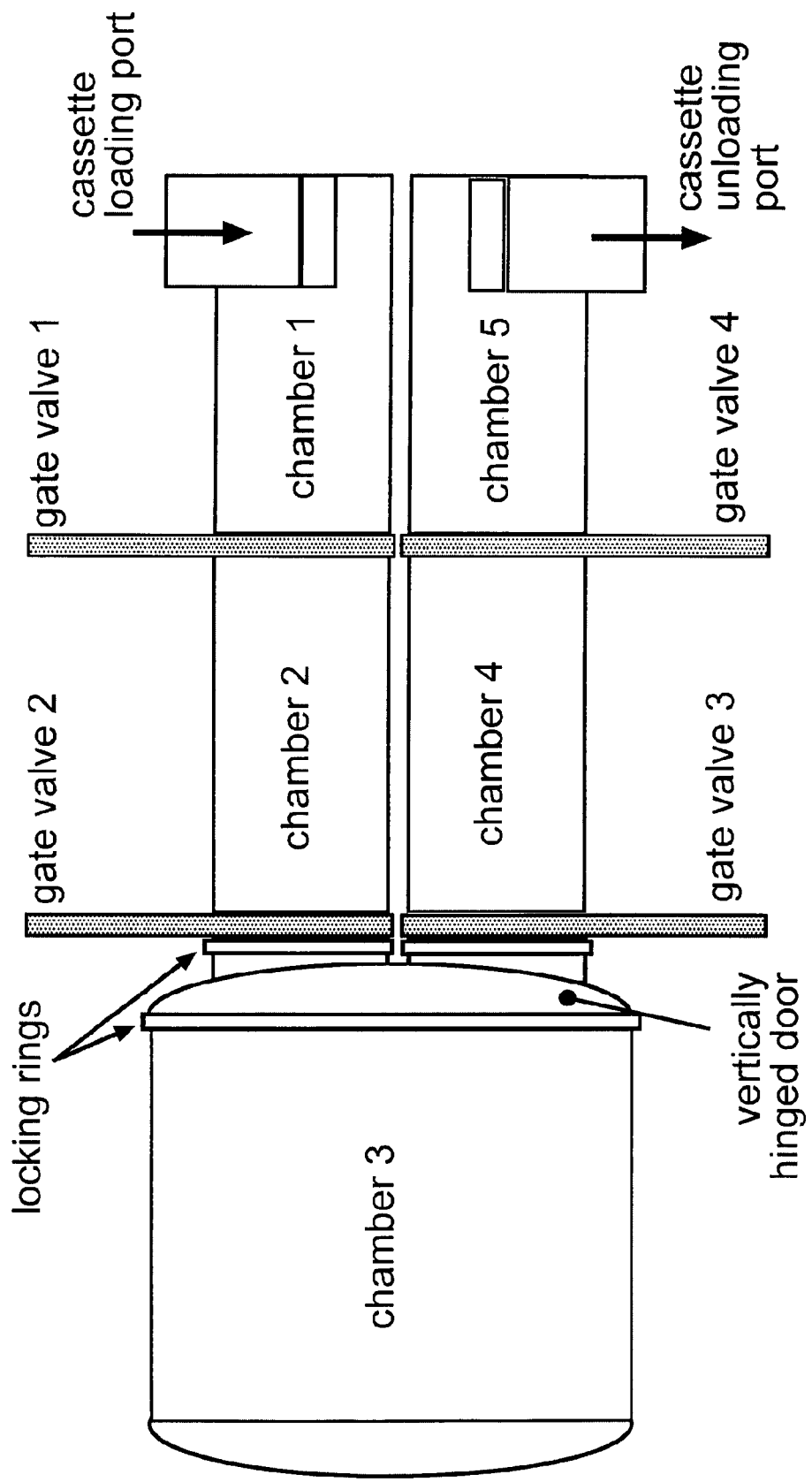
FIG. 2 is a schematic of an embodiment of the invention; with the retort of FIG. 4 as its third chamber.

Referring now to FIG. 2, chamber 1 is used to load magazines of product containers into a position from which they can be carried through the continuous retort and within which initial heating can commence by direct contact heat transfer from hot water at approximately 75 C circulating within. magazines in chamber 1 can be rotated by the support shafts to allow any trapped air to be evacuated by gravitational displacement and to permit mixing of ingredients if needed.

Once the first chamber is full of magazines gate valve 1 can be opened so that the magazines can be transported by the drive chain located between the two rotational shafts into the primary heating chamber 2.

Chamber 2 is then sealed by the closure of both gate valves (gate valve 1 and gate valve 2) and the hot water contained therein is further heated and pressurised over a period of five minutes to take the product up to the final sterilisation temperature and overpressure. Magazines in chamber 2 can also be rotated by support shafts to allow further mixing of ingredients if needed. After the required time gate valve 2 is opened so that the magazines can be transported by the drive chain located between the two rotational shafts into chamber 3. Once chamber 2 is empty the pressurised high temperature water is replaced by ambient pressure water at 75 C from the intermediate water well ready for the opening of gate valve 1 and the loading of the next magazine.

Figure 6:
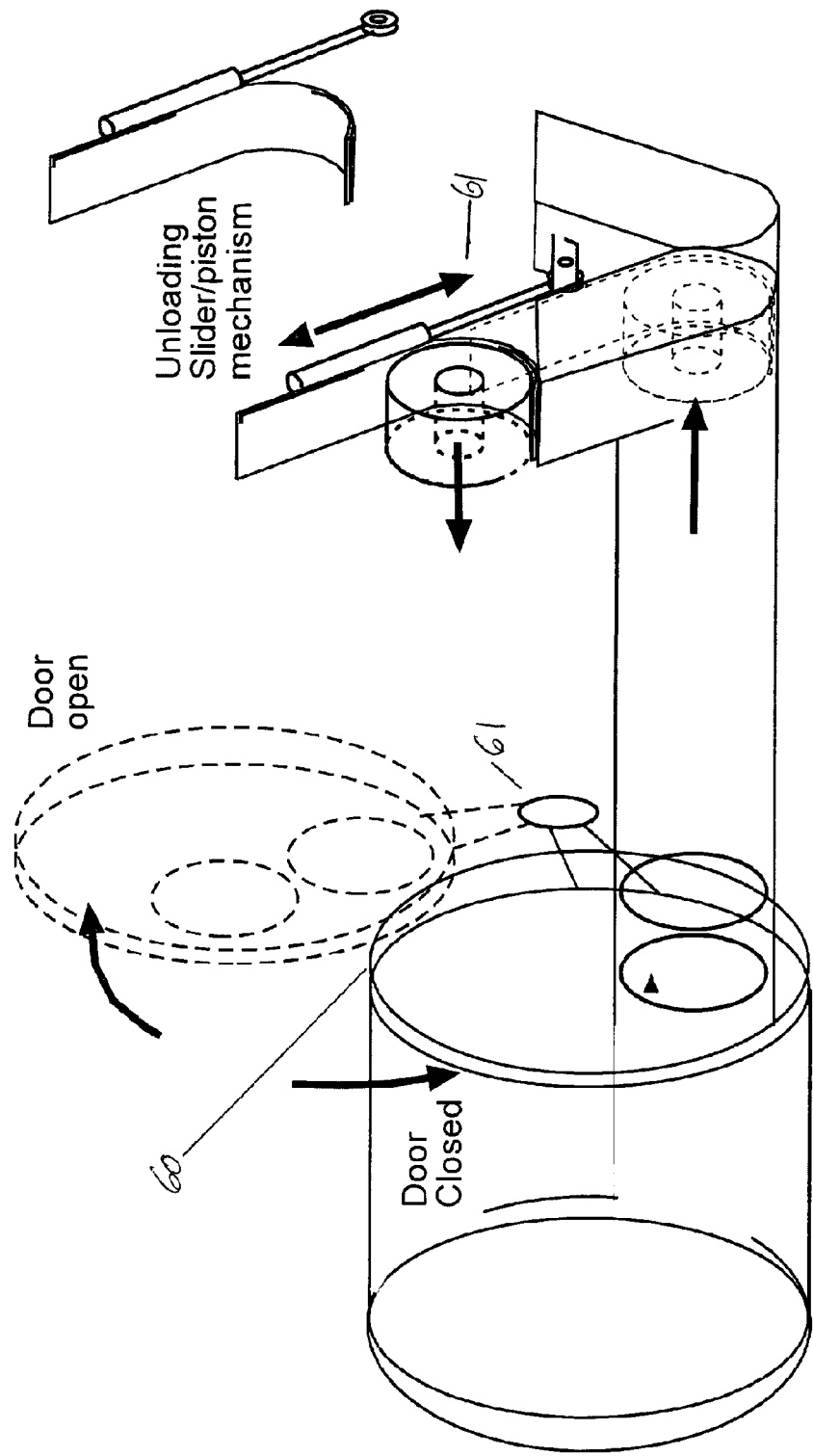
FIG. 6 illustrates the operation of the vertically hinged retort to an access door of the apparatus and one method of unloading magazines.

The door mechanism employed in the current invention is designed to facilitate access for maintenance cleanings and repair. As illustrated in FIG. 6, the door 60 is attached to a pivot point 61. It is thus enabled to pivot between an open position (shown by the dotted line) and a closed position. In the closed position, the entry and exit regions for product align with corresponding regions in chamber 2. Pressure integrity is guaranteed by sealable locking rings which seal the three openings in the door after it is closed.

Figure 4:
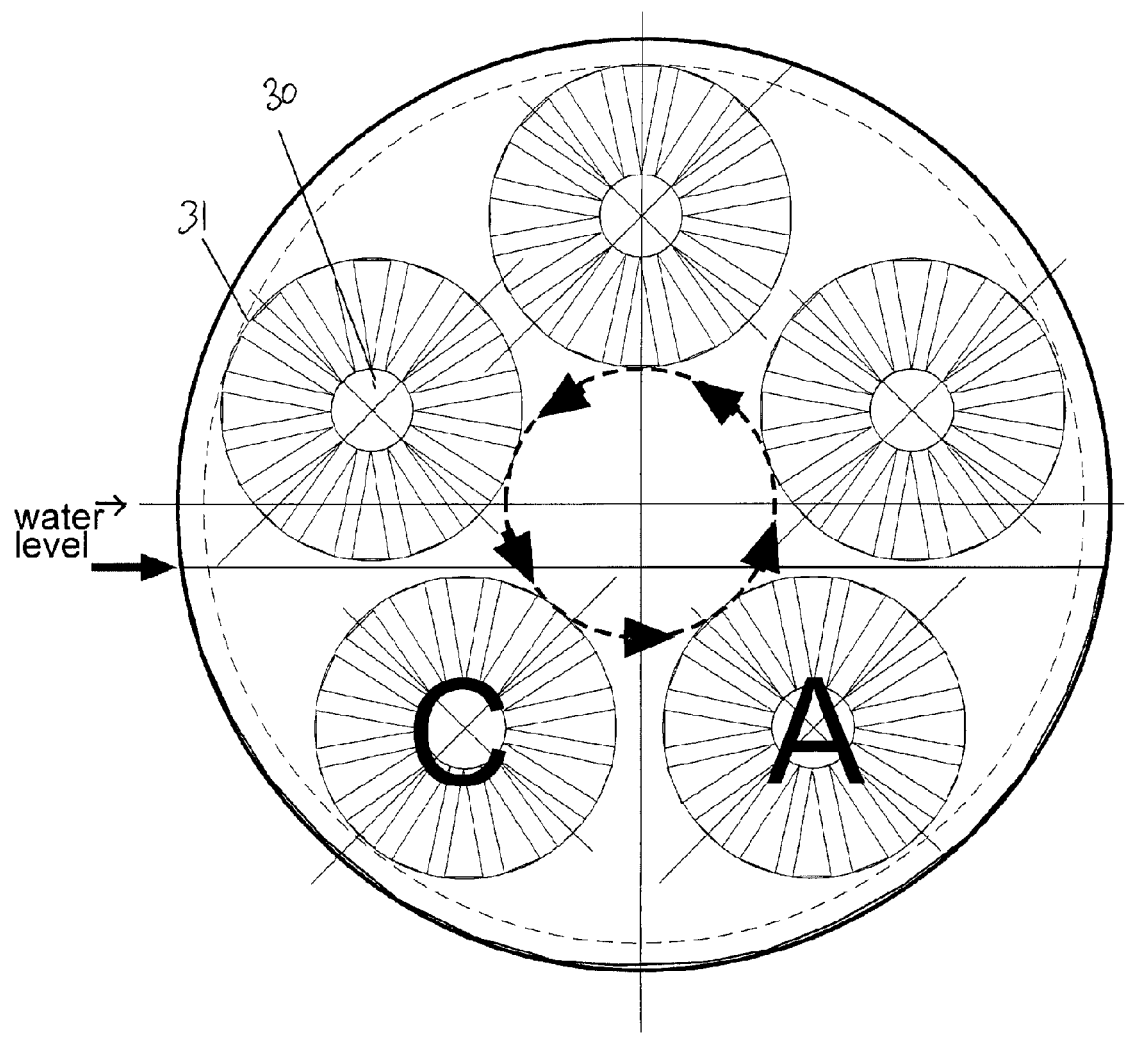
FIG. 4 is a cross-section of a retort for use in an apparatus of the invention.
Figure 5:
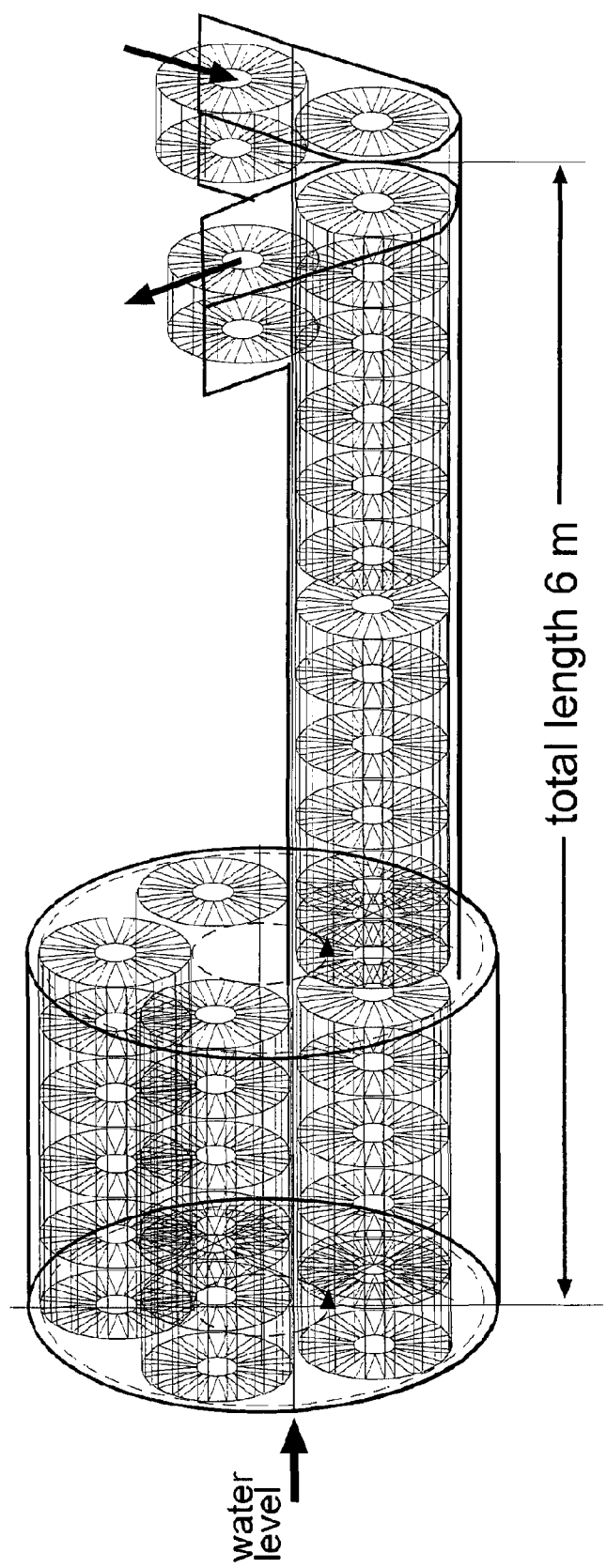
FIG. 5 is an illustration of an embodiment of the invention.

The main retort chamber 3 comprises a main circular pressure vessel and is illustrated in cross-section in FIG. 4. Within the main retort chamber 3 is disposed a large rotational frame holding five tubular compartment spigots 30 onto which the product container magazines 31 are loaded when in position A (FIG. 4). The spigot can have a throughchannel along its length enabling heating fluid to flow along its length. Chamber 3 is kept at the required sterilisation temperature and pressure by the introduction of steam at a pressure of 5 bar via multiple longitudinal sparge pipes spaced around the three tubular compartments which are above the water level. These parameters are maintained at these constants during a full normal period of operation of the retort, which could easily be several days in duration. Gas flow within chamber 3 is managed by an axial fan located in the upper section of the vertically opening door. This is arranged to force steam through the small gaps between product located within the magazines and this process is further aided by baffle plates arranged within the chamber 3 and on the mounting means.

Loading of magazines 31 into chamber 3 from the chamber 2 takes place such that the magazines 31 enter the lower half of chamber 3 and preferably below the water level maintained within chamber 3. A magazine, from the location within the pressurised water, is rotated upwardly, in the direction indicated by the arrows, out of the water (indicated by the shaded region 32 in FIG. 4) and into the pressurised steam above the water surface.

It is envisaged that the sterilisation process mainly takes place in the steam region of the chamber 3 for the following reasons. Firstly, the steam is automatically drawn to cooler regions on the surface of the magazine and the packaging due to localised lowering of the pressure immediately surrounding these regions. The cooler regions therefore draw sterilising materials (steam) onto them and therefore enhance the sterilisation processes in those regions.

The constant pressure above the water level is maintained by steam injection and ensures that no compressed air is needed in Chamber 3, thereby ensuring that no air bubbles are entrapped around the article being sterilised. This itself ensures that the heat transfer is more efficient as the air bubbles would act as an insulating material. The safety of the product due to improper sterilisation is not therefore compromised and proper heating of the product across its whole surface is improved. Purging of the air in the current invention is further facilitated by passage of product between the chambers 2 and 3 taking place in water.

After the heating cycle time period has elapsed the frame rotates through one fifth of a complete 360 degree rotation (72 degrees) allowing an empty spigot 30 to move into position A, ready for the next product container magazine to be loaded. The water level in chamber 3 is maintained at the level as shown by the arrows in FIG. 4, at all times to ensure that only water can pass into chamber 2 when gate valve 2 is open, or chamber 4 when gate valve 3 is open.

This cycle is repeated until a full compartment reaches position C. In position C the product container magazines can be unloaded by the chain drive. At any time after loading and before unloading the product magazines can be rotated independent to the rotation of the main support frame by the central arbour contained within the centre of each tubular compartment if needed. This feature can also be used in such a way as to permit product in the magazines to remain in one plane if no rotation is desired during sterilisation.

Before unloading can commence the first cooling chamber 4 needs to be filled with high temperature water and pressurised to sterilisation over pressure by closing gate valve gate valve 4 and transferring its contents to the intermediate well at the same time as filling it from chamber 3. As water is incompressible chamber 4 is instantaneously pressurised as soon as gate valve 3 is opened.

As soon as gate valve 3 is fully open the product magazines in position C are transferred to chamber 4 by the operation of the drive chain (see FIG. 3) located at the lower half of chamber 3 (the main retort chamber).

When chamber 4 has received its product magazines the gate valve gate valve 3 closes and the high temperature water is pumped back into the high temperature water storage well and replaced with water from the intermediate water storage well at around 75 C. The pressure in chamber 4 is gradually reduced to ambient over a five minute cycle as a function of the drop in water temperature in chamber 4.

Water in the intermediate well is continually being circulated through chamber 1 where it heats the incoming product from ambient up to 75 C. Water in the high temperature well is continually being circulated through chamber 2. The effect of this heat transfer is balanced by the heating effect in chamber 4 as energy is transferred from product and magazines at sterilisation temperatures to the intermediate water at 75 C. Magazines in retort chamber 3 can also be rotated by the support shafts (see FIG. 3) to allow more efficient cooling of the product if needed. After the required time, gate valve 4 is opened so that the magazines can be transported into the final cooling chamber 5 by the drive chain 40 located between the two rotational shafts into chamber 4. Said transport can be carried out using other means known in the art.

Chamber 5 is the location of the second stage of cooling where the product is cooled from 75 C to 55 C ready for air cooling to 30 C which also dries product and cassettes and then unloading via the unloading mechanism 61 shown in FIG. 6. Magazines in chamber 5 can also be rotated by the support shafts to allow more efficient cooling of the product if needed. Water from chamber 5 is circulated through a heat exchanger to enable efficient cooling and excess water is fed to the steam boiler feed tank via filters to remove any solids or other contaminants which may have arisen from potential bad seals in the product containers.

Overall water flow is designed such that that all water within the continuous retort passes through the boiler heating system and has a dwell time of at least 20 minutes above 122 C prior to re-entry to retort chamber 3 during normal operations, thereby ensuring sterility and eliminating the need to add chemicals which can damage the materials used to construct the retort.

In Prior Art processes there is a need for aggressive antimicrobial measures to be taken to maintain the elements of the apparatus free from microbial growth. In such Prior Art systems, the water is used batch wise and is often exposed to the open air. In order to minimise growth, chlorination of the water is normally undertaken. This is however a difficult process to control as the chlorine levels need to be above 1 ppm to effect microbial growth inhibition yet below 2 ppm so as not to damage the stainless steel of the apparatus.

The present invention provides a closed system which the water remains contained within the machine with heat being removed and added where necessary. The longevity of the machine is thereby increased.

The use of the same fluids to heat incoming pouches and cool outgoing pouches minimises energy requirements. Only the product and magazines are heated and cooled through the full temperature range required for sterilisation. The main bulk of the retort is maintained at steady state conditions. The mass of metal undergoing temperature and pressure variation is minimised.

The invention claimed is:

1. An apparatus for the heat treatment of a product, comprising:
   a heating unit to apply heat and pressure to bring the product from ambient towards a heat treatment temperature and pressure, said heating unit having an outlet;
   a retort unit to apply a heat treatment to the product;
   a cooling unit to allow the product to be brought down from said heat treatment temperature and pressure towards ambient, said cooling unit having an inlet; and
   at least one conveyor to pass the product through said units;
   wherein each of said units is selectably sealable from the other of said units and from ambient conditions; and
   wherein said retort unit comprises a retort chamber enclosing a volume and having at least one mounting means orbitally mounted about a longitudinal axis of said retort chamber so that said at least one mounting means is movable at least between a first position wherein said mounting means is aligned with said outlet of said heating unit whereby the product can be loaded onto said mounting means, and a second position wherein said mounting means is aligned with said inlet of said cooling unit whereby the product can be unloaded from said mounting means; and
   wherein said mounting means receives a demountably mounted magazine; and said magazine retains the product passing through said units, said magazine being axially mounted within said units and said mounting means, enabling rotation of the product about the longitudinal axis of said units and said mounting means.

2. The apparatus according to claim 1, further comprising:
   a plurality of mounting means which are laterally spaced from and capable of orbital motion around said longitudinal axis of said retort chamber.

3. The apparatus according to claim 1, wherein:
   said inlet of said cooling unit is positioned to align successively with an outlet containing a plurality of mounting means, to receive heat treated product.

4. The apparatus according to claim 3, wherein:
   said cooling unit is sealable and the temperature and pressure are controllable enabling the temperature to be brought down to ambient pressure in a controlled manner.

5. The apparatus according to claim 1, wherein:
said heating unit, said cooling unit and said retort unit each comprise at least one pressure vessel with suitable closures capable of enclosing a volume with a hermetic seal to contain product to be treated.

6. The apparatus according to claim 5, wherein:
each of said volumes of said units having an inlet and an outlet provided with a closure to effect a seal.

7. The apparatus according to claim 1, wherein:
said retort unit further comprises a plurality of elongate mounting means, which lie generally parallel to each other, and parallel to said longitudinal axis.

8. The apparatus according to claim 7, wherein:
each of said mounting means is journalled for orbital motion about said longitudinal axis.

9. The apparatus according to claim 8, wherein:
said mounting means are at a generally even lateral spacing from said longitudinal axis, and at a generally even angular spacing from each other.

10. The apparatus according to claim 7, wherein:
said mounting means are operatively associated together so as to rotate together about said longitudinal axis in an orbital motion.

11. The apparatus according to claim 10, wherein:
said mounting means are disposed on a common structural frame.

12. The apparatus according to claim 1, wherein:
each of said heating and cooling units comprise a single pressure vessel.

13. The apparatus according to claim 1, further comprising:
a series of pressure vessels or chambers each successively communicating with the other of said vessels and each defining a separately isolatable volume.

14. The apparatus according to claim 1, wherein:
at least one of said heating unit and said cooling unit enclose a volume which is divided into a plurality of serially disposed chambers.

15. The apparatus according to claim 14, wherein:
each of said volumes is provided with at least one inlet and at least one outlet.

16. The apparatus according to claim 15, wherein:
an adjacent communicating inlet and outlet pair is provided with a single openable closure.

17. The apparatus according to claim 1, wherein:
at least one of a product agitator and a product rotator is provided for association with the product in at least one of said units.

18. The apparatus according to claim 1, wherein:
each of said mounting means in said retort chamber is provided with a product rotator to rotate the product therewithin.

19. The apparatus according to claim 18, wherein:
said product rotator acting on said mounting means is operable in a contrary sense to the orbital motion of said mounting means.

20. The apparatus according to claim 18, wherein:
said product rotator acts to maintain product at constant orientation relative to the ground.

21. The apparatus according to claim 18, wherein:
at least one of said at least one conveyor, said product agitator and said product rotator are arranged to act on said carriage means.

22. The apparatus according to claim 1, further comprising:
carriage means to transport the product through said units.

23. The apparatus according to claim 22, wherein:
said carriage means comprises a transport cradle with a capacity to receive a plurality of the products for processing.

24. The apparatus according to claim 23, wherein:
each of said carriage means comprises a transport cradle with capacity to receive sufficient products for quality.

* * * * *